Oct. 9, 1956

I. Z. SMOKER 2,765,901

ATTACHMENT FOR ELEVATING AND DELIVERING
BALES FROM BALING MACHINES

Filed Aug. 21, 1950

INVENTOR.
Isaac Z. Smoker,
BY
John B. Brady
ATTORNEY

Oct. 9, 1956    I. Z. SMOKER    2,765,901
ATTACHMENT FOR ELEVATING AND DELIVERING
BALES FROM BALING MACHINES Filed Aug. 21, 1950      9 Sheets-Sheet 8

INVENTOR.
Isaac Z. Smoker,
BY
John B. Brady
ATTORNEY

Oct. 9, 1956

I. Z. SMOKER

2,765,901

ATTACHMENT FOR ELEVATING AND DELIVERING BALES FROM BALING MACHINES

Filed Aug. 21, 1950

INVENTOR.
Isaac Z. Smoker,
BY
John B. Brady
ATTORNEY

United States Patent Office 2,765,901
Patented Oct. 9, 1956

2,765,901

ATTACHMENT FOR ELEVATING AND DELIVERING BALES FROM BALING MACHINES

Isaac Z. Smoker, Intercourse, Pa.

Application August 21, 1950, Serial No. 180,550

1 Claim. (Cl. 198—167)

My invention relates broadly to baling machines and more particularly to an attachment for baling machines for facilitating the loading of bales into a transportation unit as the bales are discharged from the baling machine.

One of the objects of my invention is to provide a readily portable elevating conveyor unit adapted to be readily attached to a baling machine for receiving bales as they are discharged by the baling machine and elevating and orienting the bales to a position in which the bales may be compactly stacked in a transportation unit.

Another object of my invention is to provide a construction of attachment for elevating and delivering bales from baling machines in which each bale as it is discharged by the baling machine is automatically raised on end, elevated and oriented to a delivery position for delivery to a transportation unit in a position in which the bales may be compactly stacked therein.

Still another object of my invention is to provide a construction of attachment for the discharge end of a baler including an elevating conveyor mounted on a swinging yieldably supported abutment and a centrally disposed yieldably mounted guide roller coacting therewith for directing a bale as it is discharged by the baler into a position in which the bale may be elevated, oriented and delivered to a stacking position in a transportation unit.

Still another object of my invention is to provide an arrangement of confining housing enclosing conveyor mechanism which may be readily mounted on the discharge end of a baling machine with a coacting hood connected therewith and serving to guide and orient bales as they are discharged from the baling machine.

Still another object of my invention is to provide an attachment for baling machines which is driven by the same power which drives the baling machine for operating a conveyor mechanism on the rear of the baling machine for elevating the bales and delivering the bales to a transortation unit as the bales are discharged by the baling machine.

Other and further objects of my invention reside in the construction of attachment for elevating and delivering bales from baling machines as set forth more fully in the specification hereinafter following by reference to the accompanying drawings in which:

Fig. 3 is a top plan view of the attachment of my invention secured to the discharge end of a baling machine, parts of the hood being broken away in order to more clearly illustrate the swinging conveyor and the coacting yieldably mounted guide roller;

My invention is directed to a portable attachment for hay baling machines arranged to eliminate the necessity for collecting bales from the field as they are dropped from the hay baling machine. The attachment of my invention is mounted directly upon the discharge end of the hay baling machine and receives the completed bale as it is discharged by the baling machine and elevates the bale and automatically orients the bale and delivers the bale on an elevated platform from which the baling machine conveniently moves into a compactly stacked position in a transportation unit. The attachment of my invention saves considerable labor and eliminates the necessity for the separate bale loader which is generally required in picking up bales from the field and loading the bales into a transportation unit. With the attachment of my invention the transportation unit may run over the field immediately adjacent the baling machine and receive bales delivered by the baling machine for compact stacking as rapidly as the bales are delivered by the baling machine.

Figure 1:
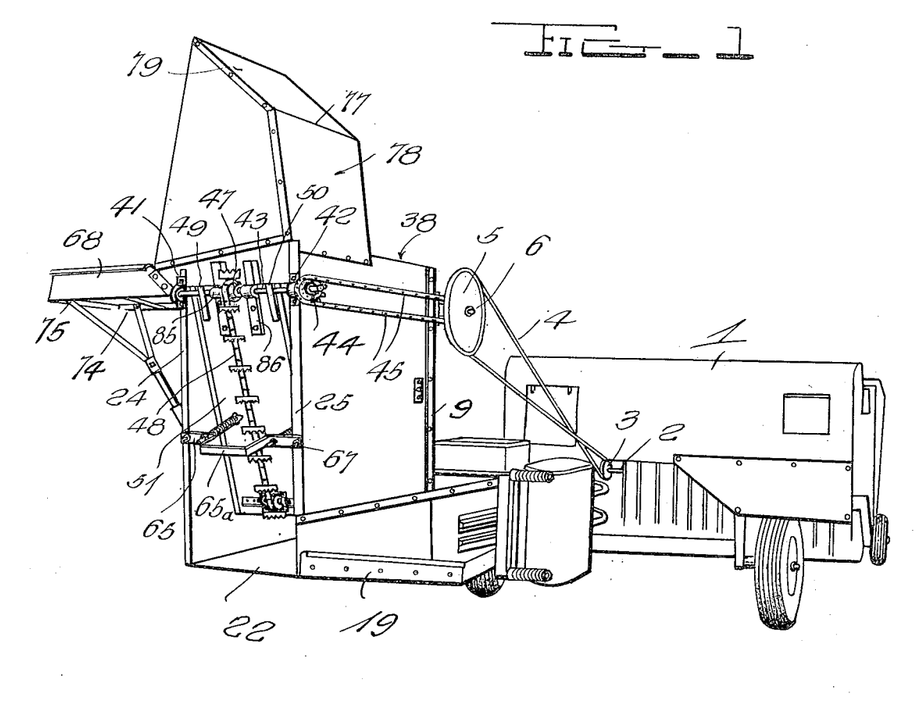
Figure 1 is a perspective view showing the discharge end of a baling machine and illustrating the attachment of my invention applied thereto.
Figure 2:
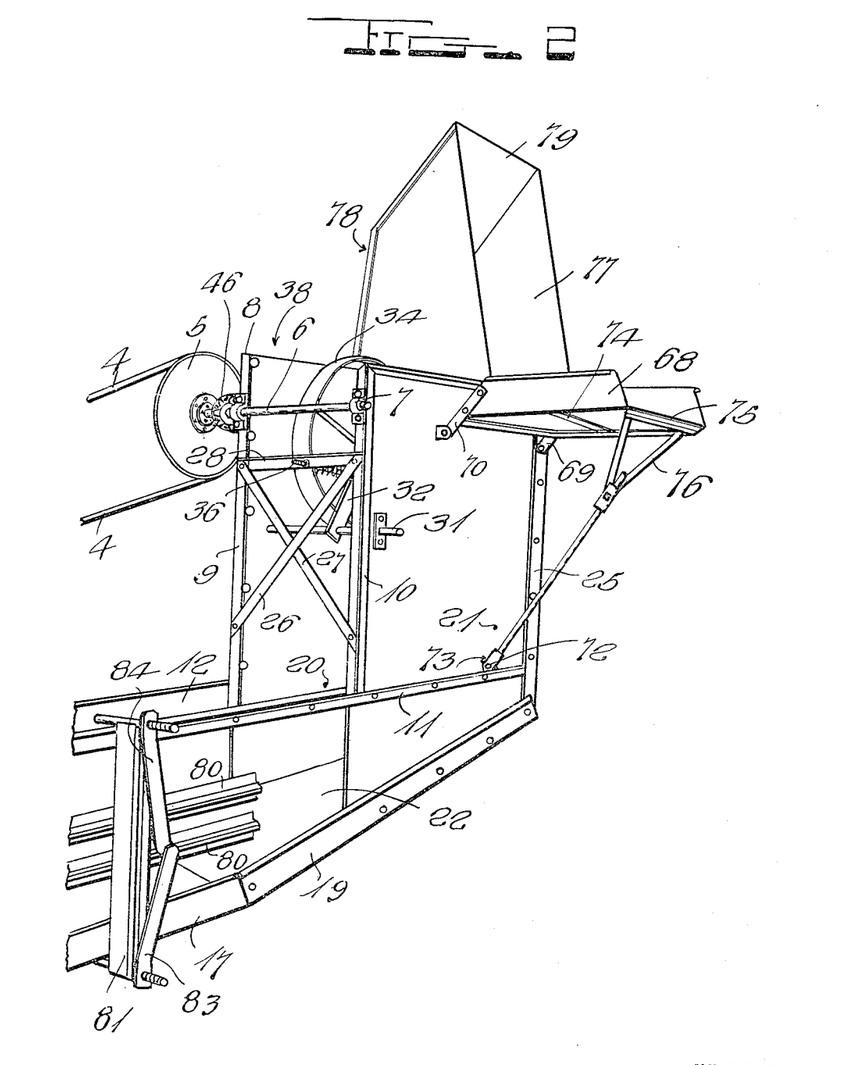
Fig. 2 is a perspective view of the attachment of my invention and showing the relation thereof to the discharge end of the baling machine.

My invention will be more fully understood by detailed reference to the drawings in which reference character 1 designates a hay baling machine including driven shaft 2 having pulley 3 thereon over which the belt is looped leading to driven pulley 5 on the attachment of my invention. The driven pulley 5 is carried by transversely extending shaft 6 which is journalled in bearings 7 and 8 carried by the vertically extending frame members 9 and 10 they are secured to the horizontally extending frame members 11 and 12. The horizontally extending frame members 11 and 12 are independently connected with the upper rear frame members 14 and 15 of the baling machine 1. The lower frame members 16 and 17 of the rear of the baling machine serve as connecting supports for the lower linearly extending frame members of the attachment of my invention. The frame members 18 and 19 of the attachment of my invention extend upwardly at an angle beneath the horizontally extending frame members 11 and 12 and serve as supports for the side walls 20 and 21 forming the housing 38 for the attachment of my invention. The lower frame members 18 and 19 also serve as a support for the inclined plane flooring 22 for directing the bale 23 as it is discharged from the baling machine 1 upwardly into the bale handling mechanism as will be more fully explained hereinafter. The lower frame members 18 and 19 serve as supports for the upwardly extending frame members 24 and 25 at the extreme rear of the attachment. The upwardly extending frame members 9 and 10 secured to horizontally extending frame members 11 and 12 reinforce the side walls 20 and 21 and are securely braced in spaced relation by diagonally disposed brace members 26 and 27 shown more particularly in Fig. 2 and horizontally disposed brace member 28. The side walls 20 and 21 support the reinforcement members 29 and 30 in which transverse bar 31 is supported. The transverse bar 31 serves as a support for an angularly movable arm 32 which carries a stub shaft 33 on the extremity thereof and which serves as a journalling means for the roller 34. The roller 34 is relatively narrow in width and operates to engage the top of the bale 23 as it is directed through the housing by the walls 20 and 21 of the attachment. The arm 32 is spring biased by means of coil spring 35 which is carried by the adjustable screw member 36 screw threaded to receive the adjusting nuts 37. The adjustable screw member 36 extends through an aperture in the horizontal brace member 28 and into housing 38 and pivotally connects at its extremity with the U-shaped member 39 secured to one side of the angularly movable arm 32. The coil spring 35 operates between the horizontal brace member 28 as an abutment and the adjustable collar 40 on the adjustable screw member 36. By adjusting collar 40 along screw member 36 the tension which is exerted by screw member 36 on U shaped member 39 and the angularly movable arm 32 is regulated. This correspondingly controls the pressure exerted by roller 34 against the bale 23 as it passes through the housing 38.

Adjacent the top of the rear end of the housing 38 I provide journalling means 41 and 42 supported by the upwardly extending frame members 24 and 25 and which serve as journalling means for transverse shaft 43. The shaft 43 carries sprocket wheel 44 thereon which is connected through sprocket chain 45 with sprocket 46 carried by driven shaft 6. Thus movement imparted to belt 4 from the driving shaft of the baling machine 1 operates pulley 5 and shaft 6 imparting movement to sprocket 46 and sprocket chain 45 for driving sprocket 44 and shaft 43. The shaft 43 carries a drum 47 in a central position thereon over which the endless chain conveyer 48 operates. The shaft 43 extends through a pair of spaced hangers 49 and 50 at oposite edges of the panel and through bearings 85 and 86 on opposite sides of the drum 47. Hangers 49 and 50 serve to support the swinging abutment panel 51 pendently from shaft 43 journaled at 41 and 42 on frame members 24 and 25 while bearings 85 and 86 stabilize shaft 43 with respect to drum 47 which is subject to very substantial strain.

The swinging abutment panel 51 is pendently suspended from shaft 43 as a center and is capable of swinging movement into and out of the housing 38 between the side walls 20 and 21. The endless chain conveyer 48 is supported with relation to the opposite end of the swinging abutment panel 51 by means of shaft 52 mounted in hangers 53 and 54 on the lower end of panel 51 and carrying drum 55 in a central position thereon over which endless conveyer 48 operates.

Figure 4:
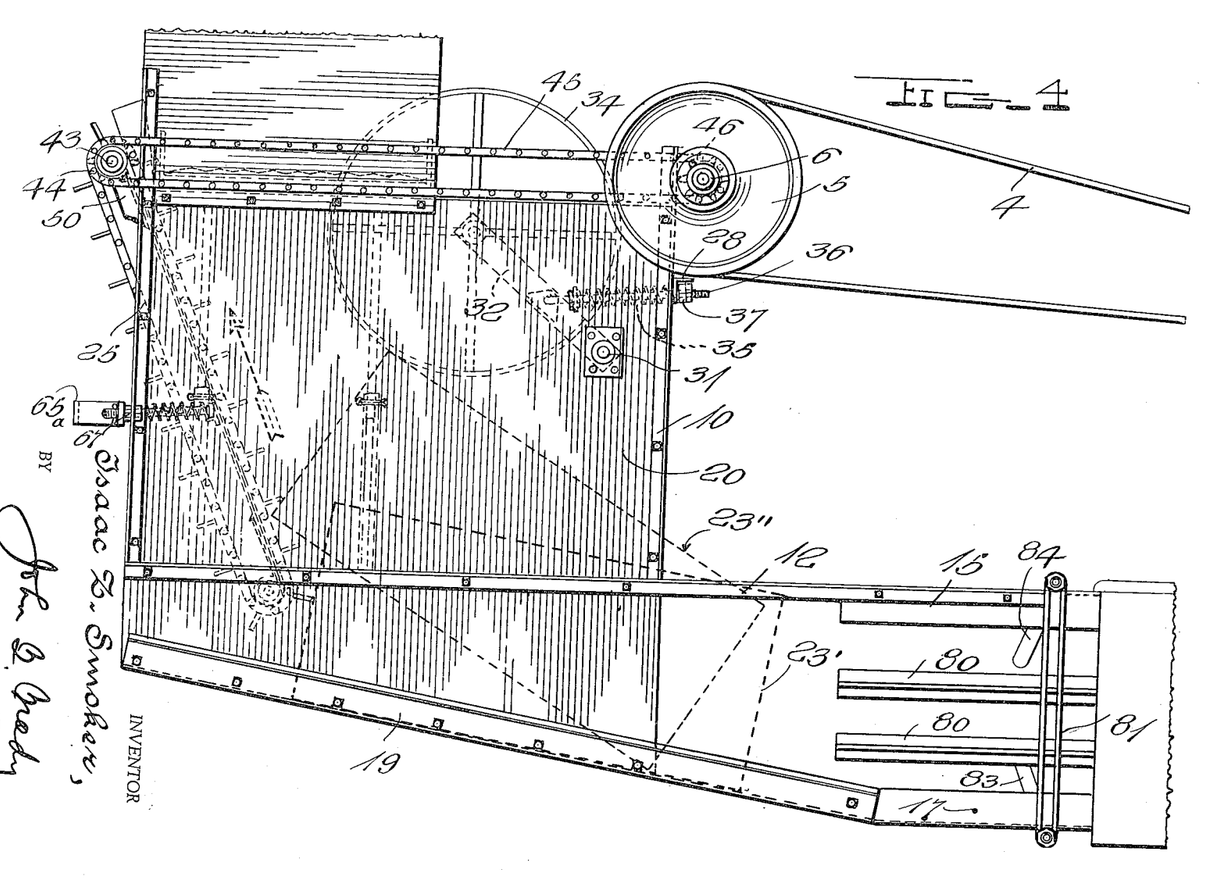
Fig. 4 is a side elevational view showing the attachment of my invention on the discharge end of a baler and illustrating in dotted lines a completed bale being directed through the housing of the attachment by the yieldably mounted swinging conveyor and the yieldably mounted guide roller.
Figures 5, 6:
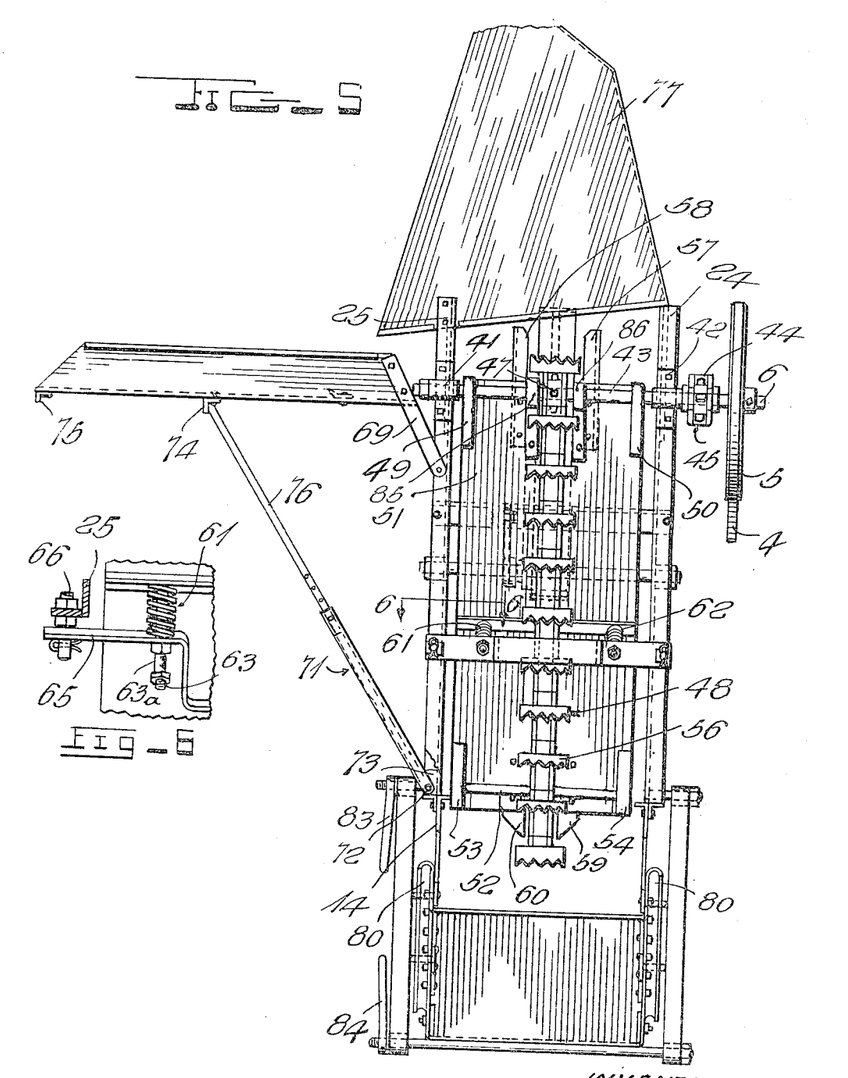
Fig. 5 is an end view of the attachment of my invention illustrating more particularly the suspension of the yieldably mounted swinging abutment and the conveyer carried thereby.
Fig. 6 is a fragmentary sectional view illustrating one of the yieldable mounts for the swinging abutments in the attachment of my invention.
Figures 11, 12, 13:
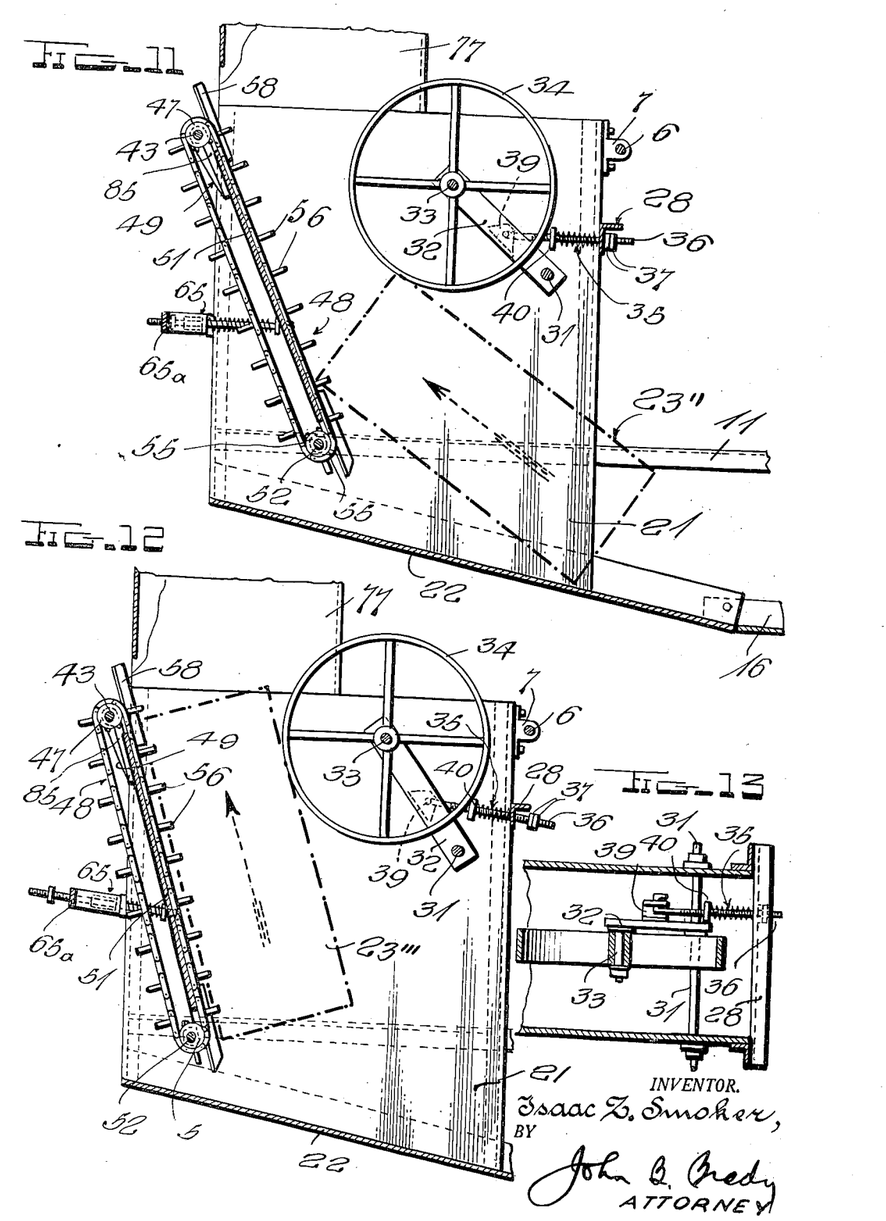
Fig. 11 is a schematic view showing the manner in which the coacting yieldable mounted guide roller and conveyor on the yieldably mounted swinging abutment grip the bale as it is delivered from the discharge end of the baling machine.
Fig. 12 is a view similar to the view shown in Fig. 11 but illustrating the bale being elevated by the conveyor on the swinging abutment while being guided by the coacting yieldably mounted guide roller.
Fig. 13 is a transverse sectional view taken through the guide roller and illustrating the arrangement of yieldable mounting therefor.

The endless conveyer 48 is provided with a plurality of transversely extending gripping members 56 having teeth thereon adapted to penetrate the compressed bale for moving the bale upwardly through the housing in co-action with the yieldably mounted roller 34. The swinging abutment panel 51 carries a pair of spaced guides 57 and 58 adjacent its upper end and a pair of spaced guides 59 and 60 adjacent its lower end adapted to guide the bale as it enters the region of the conveyer at the bottom of the housing and as it leaves the conveyer at the top of the housing. The swinging abutment panel 51 is continuously urged or spring biased in the direction of the oncoming bale 23 toward the yieldably mounted roller 34 by means of a pair of adjustable coil springs 61 and 62 shown more clearly in Fig. 10. The coil springs 61 and 62 are concentrically disposed around the screw threaded members 63 and 64 which are fastened to swinging abutment panel 51 and extend rearwardly therefrom through the coil springs 61 and 62. The screw threaded members 63 and 64 extend through the transversely extending bar 65 which is adjustably mounted at each end thereof on the vertically extending frame members 24 and 25 by means of the screw threaded adjustable attachment members 66 and 67. Each of the attachment members 66 and 67 may be adjusted and locked in position to selectively maintain the bar 65 in predetermined spacial relation with respect to the rear of the housing 38. The bar 65 is centrally offset as represented at 65a to extend around the gripping members 56 of the endless chain conveyer 48. The bar 65 is apertured on each side of the offset portion 65a for the passage of screw threaded members 63 and 64. Sleeve members 63a and 64a surround the screw threaded members 63 and 64 and abut against the bar 65 and serve as stops against which the adjusting nuts 63b and 64b may be adjusted in controlling the effective tension of springs 61 and 62 upon the swinging abutment panel 51. The swinging abutment panel 51 is normally urged by coil springs 61 and 62 into the path of the oncoming bale 23 as shown more particularly in Figs. 4, 8 and 11 and serves as cushioning means for yieldably directing the bale through the housing.

The housing 38 is provided at one side thereof with a horizontally extending bale receiving platform 68. Platform 68 is supported with relation to vertically extending frame member 25 by bracket 69 and with relation to the side wall 21 of housing 38 by bracket 70. The platform 68 is placed adjacent its extending end by means of a diagonally extending adjustable brace 71 pivotally mounted at 72 on bracket member 73 carried by the horizontally extending frame member 11. The brace 71 is adjustable to different positions for maintaining platform 68 in either a horizontal position or in an angularly disposed position. For this purpose transverse angle members 74 and 75 are provided on the underside of platform 68 for engagement by the adjustable yoke shaped end 76 of the brace 71.

Intermediate the top of the housing 38 and the platform 68 I provide a hood 77 which is shaped to direct the bale 23 as it emerges from the elevating system to a position on platform 68 which is transverse to the position in which the bale is delivered from the baling machine. That is to say, the hood 77 has in inclined wall 78 against which the bale strikes as it is ejected from the elevating system. The plane of the inclined wall 78 is directed at an acute angle with respect to the vertical axis of the housing 38 in a direction toward platform 68. Thus a bale 23 emerging from the elevating system is tipped toward the platform 68. In order to turn the bale about its transverse axis as it fully emerges from the elevating system I provide a contiguous inclined wall 79 beneath hood 77 which serves to turn the bale to a position in which the bale gravitates to a horizontal position on platform 68 which is transverse to the position in which the bale originally emerged from the discharge end of the baling machine.

Figure 7:
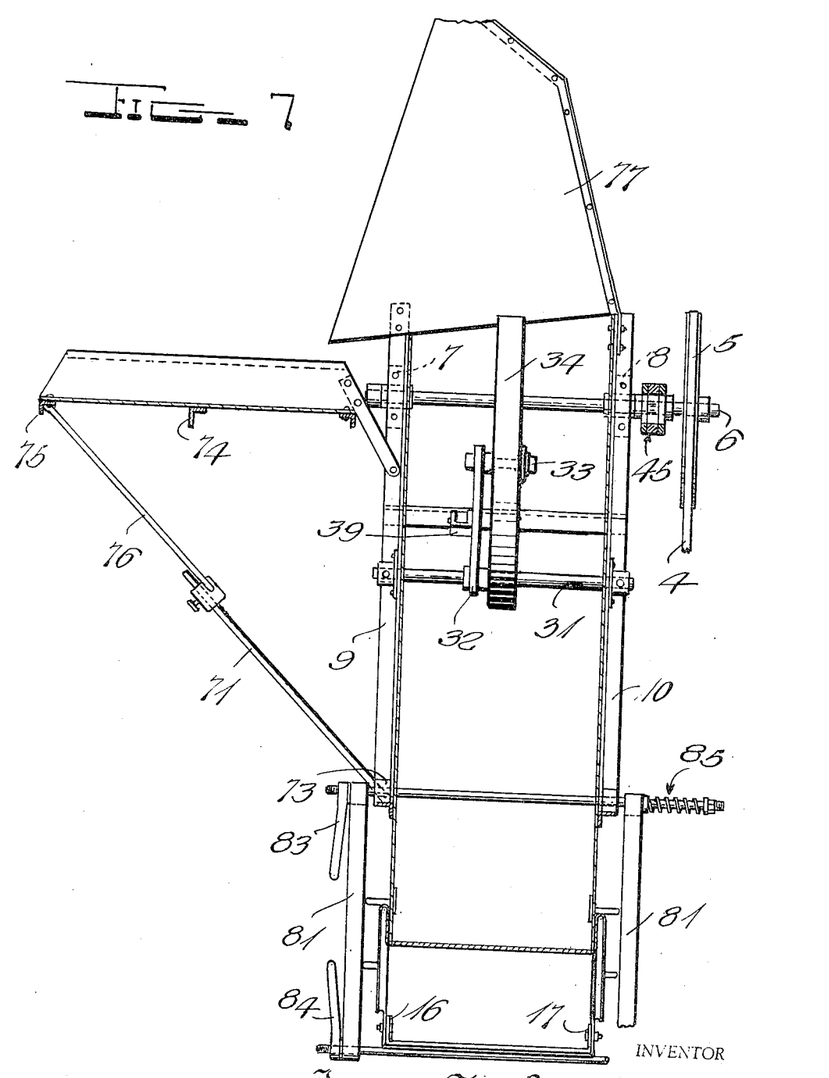
Fig. 7 is a vertical sectional view taken substantially on line 7—7 of Fig. 3 and illustrating particularly the mounting means for the guide roller which directs the bale toward the conveyer on the swinging abutment.

The discharge end of the baling machine includes the conventional longitudinally extending compressor bars 80 which are controllable in position by the compression members 81 and 82 having appropriate adjustment means 83 and 84 operating under control of suitable spring means represented schematically in Fig. 7 at 85.

The attachment of my invention may be secured as a unit to the discharge end of the baling machine. Because of the light weight construction of the unit, the installation does not disturb the equilibrium of the mechanism of the baling machine and forms a unitary part of the baling machine.

Figure 8:
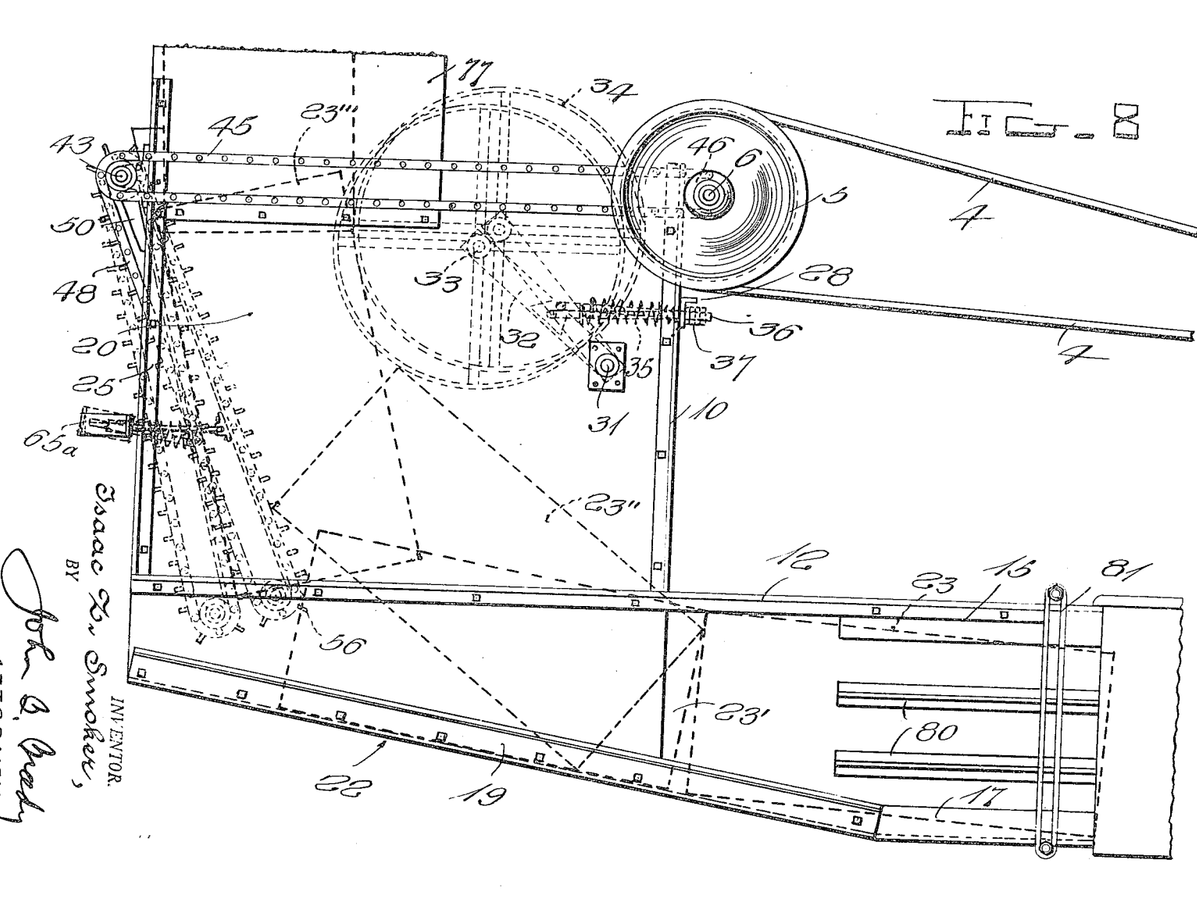
Fig. 8 is a diagrammatic view looking at the side of the attachment of my invention and illustrating particularly the angular displacement of the swinging abutment and conveyor and the angular displacement of the coacting guide roller as the bale moves through the housing of the attachment of my invention.
Figures 9, 10:
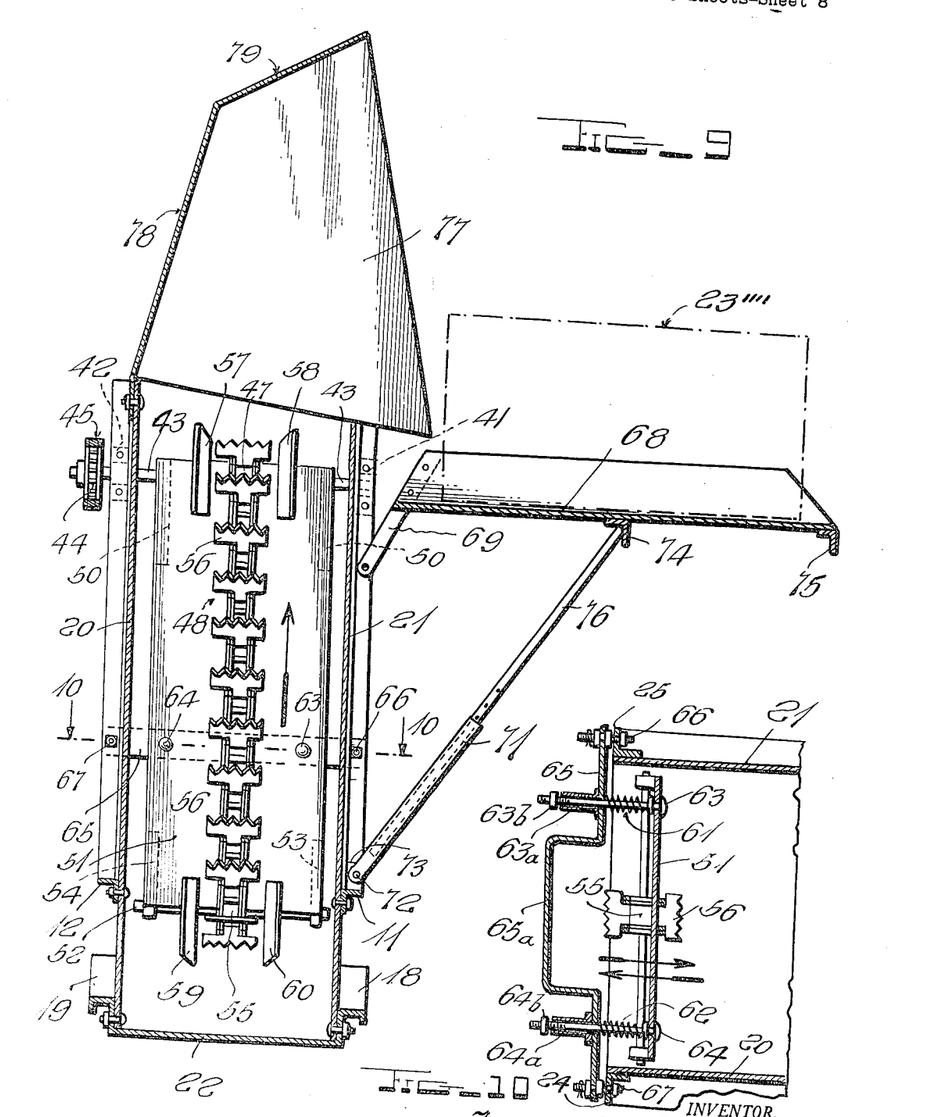
Fig. 9 is a vertical sectional view taken substantially on line 9—9 of Fig. 3 and illustrating the yieldably mounted swinging abutment and the conveyer carried thereby together with the guide means for the bale.
Fig. 10 is a fragmentary transverse sectional view taken on line 10—10 of Fig. 9 showing more particularly the yieldable mounting means for the swinging abutment.

In order to fully explain the movement of the bales from the discharge end of the baling machine, I have shown in Figs. 4, 8, 9, 11 and 12 the bale 23 in dotted lines as the bale moves through the housing 68. In Fig. 8 it will be seen that the bale 23 as it is discharged from the baling machine exerts pressure on the end of the previously completed bale indicated at 23' moving the bale 23' up the inclined plane 22 to a position where the end thereof is engaged by the gripping members 56 of the upwardly moving endless conveyer 48 thereby elevating the bale to the position represented at 23". The bale 23" is further raised by the gripping members 56 of the upwardly moving conveyer 48 to a position where the upper side of the bale 23" is engaged by the yieldable roller 34. Yieldable roller 34 tends to force the bale into engagement with gripping members 56 as represented more particularly in Fig. 12 where the bale 23''' in which position the bale is rapidly elevated by the coaction of roller member 34 and the upwardly moving gripping members 56 of endless conveyer 48. Bale 23''' is now ejected into the hood 77 and the upwardly protruding end thereof is tilted by the inclined wall 78 and is further tilted by the contiguous inclined wall 79 so that the bale falls to the position 23'''' shown in Fig. 9. The platform 68 being at a level above the transportation unit affords a most convenient means for moving the bale into a compactly stacked position within the transportation unit. The attachment of my invention has a width which is substantially the same as the width of the discharge end of the baling machine so that substantially no additional transverse space is required in maneuvering the baling machine with the attachment of my invention in position. The platform 68 is hingedly mounted on bracket 69 and 70 so that it may be moved to a collapsed position hanging pendently at one side of the housing 38 when the machine is being moved into operating position. The driving pulley 5 and sprocket chain 45 project but a slight distance beyond the side of the attachment and do not constitute any appreciable obstruction with respect to the overall width of the machine.

I have found the structure of my invention highly practical in its manufacture, installation and operation and while I have described my invention in certain preferred embodiments, I realize that modifications may be made and I desire that it be understood that no limitations upon my invention are intended other than may be imposed by the scope of the appended claim.

What I claim as new and desire to secure by Letters Patent of the United States is as follows:

A bale receiving and handling means comprising a frame structure having a width substantially corresponding to the width of a bale and consisting of a pair of vertically extending side plates having a bale entry passage therebetween adjacent the base of the front of said frame structure for receiving a bale moving through said frame structure, a transverse member journaled adjacent the top of the front portions of said side plates, an arm pivotally mounted on said member, a roller rotatably mounted on said arm and movable in a plane centrally between said side plates, means biasing said arm and roller toward the rear of said frame structure, a drive shaft journaled adjacent the tops of said side plates forwardly of said roller, an end plate pivotally suspended on said shaft between the front of said side plates, means biasing said end plate toward said roller, an endless conveyor carried by said end plate and means for driving said endless conveyor for imparting movement thereto in an upwardly direction whereby bales passing through the bale entry passage are moved upwardly between said roller and said conveyor for discharge through the top of said side plates and in which one of said side plates serves to support a substantially horizontally extending platform is supported at one side of the top of one of said side plates and wherein both of said side plates serve to support a hood directly over the discharge position at which bales emerge between said endless conveyor and said roller, said hood being shaped to direct bales from the discharge end of said conveyor onto said platform.

References Cited in the file of this patent
UNITED STATES PATENTS

| | | |
|---|---|---|
| 1,090,670 | Zimmerman | Mar. 17, 1914 |
| 1,570,256 | Hunt | Jan. 19, 1926 |
| 1,857,373 | Goggins | May 10, 1932 |
| 2,174,605 | Spencer | Oct. 3, 1939 |
| 2,316,435 | James | Apr. 13, 1943 |
| 2,367,970 | Smoker | Jan. 23, 1945 |
| 2,372,902 | Lewis | Apr. 3, 1945 |
| 2,374,334 | Curran | Apr. 24, 1945 |
| 2,390,306 | Hunziker | Dec. 4, 1945 |
| 2,518,606 | Eicher | Aug. 15, 1950 |
| 2,597,219 | Appel | May 20, 1952 |